April 8, 1952 G. MAK ET AL 2,591,955

CIRCUIT ARRANGEMENT FOR THE STABILIZATION OF ALTERNATING CURRENT VOLTAGES

Filed May 22, 1948

GERRIT MAK
ANDRE WILLEM STORM
INVENTORS.

BY Fred M Vogel

AGENT.

Patented Apr. 8, 1952

2,591,955

UNITED STATES PATENT OFFICE 2,591,955

CIRCUIT ARRANGEMENT FOR THE STABILIZATION OF ALTERNATING CURRENT VOLTAGES

Gerrit Mak, Sydney, New South Wales, Australia, and Andre Willem Storm, Eindhoven, Netherlands, assignors to Hartford National Bank & Trust Company, Hartford, Conn., as trustee Application May 22, 1948, Serial No. 28,578
In Australia December 19, 1944

4 Claims. (Cl. 323—23)

This invention relates to a circuit arrangement for the stabilization of the voltage, waveform or phase of alternating current voltages and it is the object of the invention to provide means whereby the voltage, waveform or phase of an alternating current voltage may be stabilized and/or controlled and rendered substantially independent of fluctuations in the supply voltage or in the load.

According to one embodiment of the invention the output circuit of an amplifier is connected, either directly or indirectly, in series with the supply voltage and the load with the result that the voltage, waveform or phase of the voltage applied to the load is the sum of, or the difference between, the voltage waveform or phase of the supply voltage and the voltage waveform or phase of the voltage in the output circuit of the amplifier.

A voltage and waveform which is the difference between the voltage and waveform across the load and a stable voltage and waveform generated by any suitable known means, (hereinafter referred to as the reference voltage) is applied to the input circuit of the amplifier and hence the voltage and waveform in the output circuit of the amplifier will be an amplified version of the difference between the load voltage and waveform and the reference voltage and waveform. As the output of the amplifier is in series with the supply voltage and the load, the voltage and waveform applied to the load will be caused to approach that of the reference voltage provided that the output of the amplifier is correctly phased with respect to the supply voltage. Thus, any divergence between the two voltages is reduced inversely as the gain of the amplifier.

The operation of the arrangement and the manner in which the voltage and waveform across the load depends upon the reference voltage and the gain of the amplifier is made clear by the following mathematical explanation.

If the supply voltage is E$m$, the reference voltage E$c$, the amplifier output voltage E$a$, the gain of the amplifier C times, the voltage across the load E$o$, and the input voltage to the amplifier E$i$, the following equations can be written.

$$Eo=Em+Ea \qquad (1)$$

$$\text{and } Ei=Ec-Eo \qquad (2)$$

$$\text{and } Ea=CEi=C(Ec-Eo) \qquad (3)$$

Substituting the value of E$a$ in Equation (3) in Equation (1) gives:

$$Eo=Em+CEc-CEo$$

$$(1+C)Eo=Em+CEc$$

and if $C \gg 1$ $$Eo=Ec-\frac{Ec}{C}+\frac{Em}{C} \qquad (4)$$

The mains voltage E$m$ may vary by a certain percentage $p$. E$m$ may therefore be written $$Em \text{ nom} \pm p\%$$

Substituting in Equation (4) gives:

$$Eo=Ec-\frac{Ec}{C}+\frac{Em\text{ nom}}{C}\pm\frac{p}{100C}Em\text{ nom} \qquad (5)$$

If Ec and E$m$ differ by 10% maximum and C has a value of at least 50, it can be said that $$\frac{Em\text{ nom}}{C}-\frac{Ec}{C}$$

can be neglected, and therefore Equation (5) can be written $$Eo=Ec\pm\frac{p}{100C}Em\text{ nom}=Ec\pm\frac{p\%}{C}$$

As Ec is very nearly constant Eo varies by $$\frac{p\%}{C}$$

Taking $p\%=10\%$ and $C=50$, the variation is $$\frac{10\%}{50}=0.2\%$$

The same argument can be followed for distortion of waveform and it will be found that the distortion is reduced by a factor 50.

The practical limitation of stabilization and the reduction of distortion is set by the voltage Ec.

As can be seen from Equation (4) Eo is practically equal to Ec for large values of C. This means that the stability of Eo is practically that of Ec but it can never be better than that of Ec.

According to a modification of the invention a reference voltage and waveform is subtracted from the supply voltage and waveform and the resultant voltage is fed, via an amplifier having a total gain of unity, into a circuit in series with the supply voltage and the load. The gain of the amplifier should preferably be stabilized by a relatively high percentage of voltage feedback so that the effective impedance of the output circuit of the amplifier, viewed from the circuit in series with the supply voltage and the load, is small.

It is evident from the foregoing that, if the voltage and waveform across the load differs from that of the reference voltage, the amplifier either delivers power to, or absorbs power from, the power supply according to whether the instantaneous power supply voltage is less than, or greater than, the instantaneous reference voltage.

Circuit arrangements are known in which thermionic valves are used for the stabilization of direct current voltages but such circuit arrangements differ from the circuit arrangements according to the invention in that the direct current stabilization circuits consume power from the power supply under all conditions, whilst the circuit arrangements of the invention achieve the object of the invention by adding power to, or by consuming power from, the power supply.

In order that it may operate in the most efficient manner the amplifier used should be designated so that the external impedance, i. e. the impedance of the supply voltage and the load in series with it, viewed from the amplifier, is such that the amplifier can deliver its maximum undistorted output.

The power loss, due to the series circuit comprising the output circuit of the amplifier, the supply voltage and the load, when the voltage across the load is identical with that of the reference voltage, is the product of the square of the current through the load and the impedance of the output circuit of the amplifier, viewed from the terminals connected in series with the supply voltage circuit. In circumstances where it is desired to control the value of this reflected impedance, use may be made of the properties of current and/or voltage negative feedback.

In some applications of the invention, it may be desirable to use class B amplifiers in order to take advantage of their high direct current to alternating current conversion efficiencies.

In circuit arrangements in accordance with this invention the connections to the amplifier may be such that, for frequencies other than that of the reference voltage, the whole of the output of the amplifier is fed back to the input circuit of the amplifier and under these conditions it is possible for the amplifier to oscillate as a result of undesired phase changes in the circuit. In order to prevent or limit these undesirable oscillations the frequency range of the amplifier may be restricted, phase shifting networks may be used and/or frequency discriminating limiting devices may be applied in forms that are well known to those skilled in the art.

One of the most convenient methods of obtaining the difference between the voltage and waveform across the load and the reference voltage and waveform is by means of transformers having their secondary windings connected in series so that the total voltage across the secondary windings is equal to, or proportional to, the difference.

Alternatively, a vacuum tube amplifier or repeater may be used and the voltage difference obtained from the output of the amplifier or repeater. This method has the advantage of minimizing interaction between the supply voltage and the reference voltage.

The reference voltage may be generated by any known means, including, inter alia, a stabilized tube or other generator, synchronized with the supply voltage. Alternatively, it may be derived from the main power supply by means of a repeater fitted with an effective automatic gain control, an attenuator limiter and filter, or by means of a barretter and series resistor of suitable magnitude and temperature coefficient in conjunction with a filter connected across the series resistor if wave form is important.

It should be noted that the stability and waveform of the voltage across the load cannot be better than the stability of the voltage and waveform of the reference voltage, and it is therefore advisable, if the source of the reference voltage is the main power supply to include stabilizing means of any known type to prevent the reference voltage "hunting" with the voltage across the load. For example, if an oscillator or an automatic gain controlled amplifier, or alternatively a limiter is used, stabilizing devices such as gas-filled regulators or barretters should be used in suitable arrangements to ensure a high degree of stability in the reference voltage.

A convenient form of oscillator or amplifier is one in which the gain is controlled by means of negative feedback, one element of the feedback network having the characteristics of a barretter which maintains a substantially constant output regardless of variations in the input voltage.

It will be apparent that, with fluctuations of short period in the supply the degree of stabilization is dependent upon the speed of operation of the stabilizing device used in connection with the production of the reference voltage but if the speed is low, circuits having a comparatively long time constant or persistency may be used to minimize this defect.

If the invention is to be applied to the production of a waveform having a special shape, any generator capable of providing that shape may be used to generate the reference voltage. It should be noted however that, whereas only a limited frequency range is required in the amplifier for the production of a stabilized voltage having a sinusoidal waveform, a much greater frequency range may be necessary to produce voltages having special waveforms across the load.

In order that the invention may be more readily understood, reference will now be made to the accompanying drawings in which.

Figures 1, 2, 3, 4, 5:
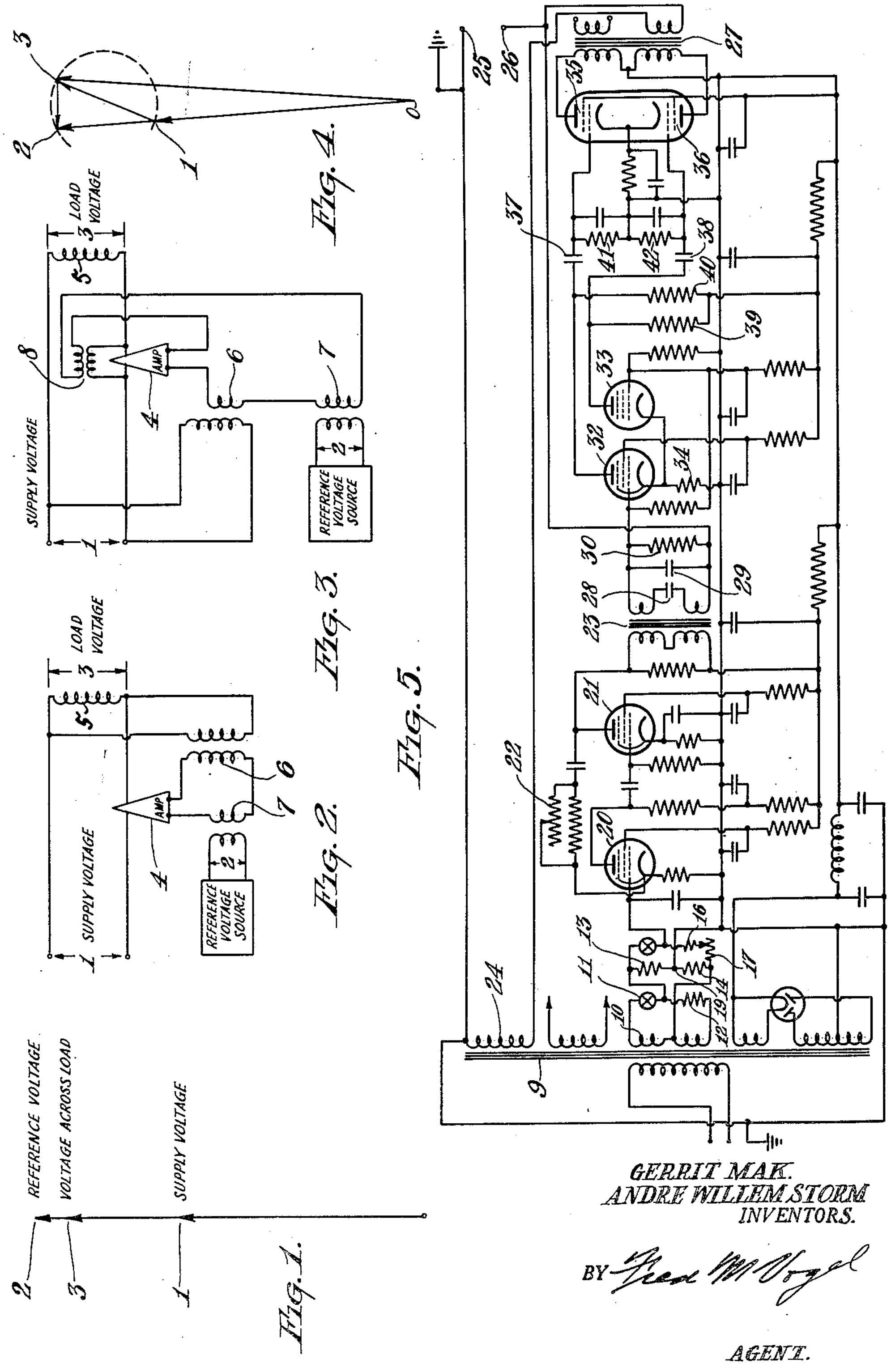
Figure 1 shows by means of vector diagrams the operation of the invention for a particular condition.
Figure 2 is a schematic circuit diagram of one embodiment of the invention.
Figure 3 is a modification of the circuit of Figure 2.
Figure 4 shows by means of vector diagrams the operation of a modified form of the invention where a phase shift takes place in the amplifier.
Figure 5 is the circuit diagram of one practical adaptation of the invention.

In Figure 1 of the drawings, the vector 0, 1 represents the supply voltage and the vector 0, 2, which is shown in the figure as being in phase with the vector 0, 1, represents the reference voltage. The vector 0, 3 represents the voltage across the load or the output voltage and is produced by adding to the supply voltage (vector 0, 1) a voltage represented by the vector 1, 3 which is equal to the voltage represented by the vector 2, 3 (the difference between the reference voltage and the output voltage) multiplied by the gain of the amplifier, assuming that no phase shift takes place in the amplifier. It is evident from Figure 1 that the output voltage will become stable when Output voltage=(voltage of supply) + (difference between the reference voltage and the output voltage) × (gain of the amplifier).

In Figure 2 the numeral 1 represents the supply voltage, the numeral 2 the reference voltage, the numeral 3 the voltage across the load 5 or the output voltage, the numeral 4 the amplifier, the numerals 6 and 7 transformers having a ratio of one to one between their primary and secondary windings. The transformers 6 and 7 are so connected that the difference between the voltages delivered by their secondary windings is applied to the amplifier 4.

The circuit of Figure 2 may be modified in many ways as will be apparent to those skilled in the art. For example, the transformers 6 and 7 need not have a ratio of one to one but if they are not of this ratio the output voltage will acquire a value dependent upon the change in ratio.

Figure 3 represents a modification of the circuit of Figure 2 but is the equivalent of the circuit of Figure 2. In Figure 3 the supply voltage is balanced against the reference voltage 2 by means of the transformers 6 and 7. The difference in the voltages supplied by the secondary windings of the transformers 6 and 7 is applied to the input of the amplifier 4, the gain of which is stabilized at unity by means of a negative feed-back between the output and input circuits of the amplifier. The coupling for the feedback circuit takes place via the transformer 8. This circuit may be explained in a simple manner by stating that the difference between the reference voltage and the supply voltage is injected in series with the load by means of the amplifier 4 having a gain of unity. Nevertheless this circuit is only a simple modification of that of Figure 2 and the formulae relating to the design of both circuits are practically identical.

In lieu of the transformers 6 and 7, two pentode thermionic valves may be used in conjunction with a common output load which feeds the input to the amplifier 4. The voltage 3 across the load, or a portion thereof, is applied to the control grid of one of these valves while the reference voltage 2 is applied to the grid of the other valve in phase opposition to the voltage 3. The difference between the two voltages will then be available across the common output load provided that the gain and attenuation of each of the two voltages is suitably adjusted.

In another form of the invention, the difference voltage may be derived by means of resistance networks. For example, the voltage 3 and the reference voltage 2 may be applied via a series resistance of suitable magnitude to a common resistance in which event the potential difference across the common resistance will be proportional to the voltage difference if the initial voltages are 180 degrees out of phase and the resistances are of suitable values.

The vectors shown in Figure 1 depict the condition when the supply voltage and reference voltage are in phase and the amplifier has zero phase shift. This condition is desirable for stabilizing the voltage and waveform of the voltage across the load or the output voltage with minimum demands on the amplifier. If the reference voltage and the supply voltage are not in phase with each other the output delivered by the amplifier will be greater than for the case when these voltages are in phase with each other.

On the other hand, where the waveform or the phase of the output voltage are not considerations, but it is desired to produce the maximum stabilization of the ouput volage, a phase shift of approximately ninety degrees in the amplifier is advantageous. This is shown in Figure 4 of the drawings.

In Figure 4, the vector 0, 1 represents the supply voltage and the vector 0, 2 represents the reference voltage. The vector 0, 3 represents the voltage across the load or the output voltage which can be evaluated in the following manner.

The voltage across the load or the output voltage comprises the sum of the supply voltage and the output voltage of the amplifier. The output voltage of the amplifier is the difference between the output voltage and the reference voltage multiplied by the gain of the amplifier with the phase of the product shifted through ninety degrees. The locus of the point 3 will therefore be a semicircle constructed on the line 1, 2, the precise location of the point 3 being such that the line 1, 3 is equal to the line 2, 3 multiplied by the gain of the amplifier. Under these conditions the magnitude of the vector 0, 3 more nearly approaches the magnitude of the reference vector 0, 2 for an amplifier of the stated gain than under the conditions of Figure 1 but the voltage across the load or the output voltage is no longer in phase with the reference voltage.

As an example of the increased stabilization achieved by giving the amplifier a phase shift of approximately ninety degrees the case for an amplifier with a gain of 100 times may be quoted. With such an amplifier without phase shift a variation of 10% in supply voltage will be reduced to a variation of approximately 0.1% in the output voltage while, with a phase shift of ninety degrees in the amplifier, a variation of 10% will be reduced to a variation of approximately 0.001% in the output voltage.

It should be noted that the introduction of a phase shift of approximately ninety degrees into the amplifier circuit may cause instability in the amplifier unless certain precautions are observed. It is well known that a phase shifting network which depends upon reactances for producing the phase shift causes phase shifts of different amounts for different frequencies. In a circuit constructed in accordance with the invention, the feedback from the output of the amplifier to the input is relatively large and if by mischance the total phase shift at some frequency is in excess of ninety degrees instability may occur at that frequency or the amplifier may oscillate. This difficulty may be avoided by so designing the amplifier that no more than two reactances are included in the amplifying and feedback circuits. An amplifier so designed may be made stable at all frequencies and yet have adequate gain together with a phase shift which approaches ninety degrees at the frequency of the supply voltage which is to be stabilized.

In the foregoing description the effects of the output impedance of the amplifier have been neglected. As a result of the circuit connections, which resemble those of a circuit incorporating negative voltage feedback, the effects of the output impedance of the amplifier are small and in any case can be taken into account in the design of apparatus according to the invention. Alternatively, a voltage dependent upon the current flowing in the load circuit may be derived, for example, from across a resistor in series with the load, and this voltage may be added to, or subtracted from, the reference voltage in such manner as to compensate for variations in the voltage losses due to the output impedance of the amplifier.

The circuit diagram of a practical embodiment of the invention is shown in Figure 5 of the drawings.

In this figure, the numeral 9 indicates a transformer the primary winding of which is fed from a suitable alternating current source. The transformer is equipped with a plurality of secondary windings for purposes hereinafter described.

The numeral 10 indicates a secondary winding from which is derived the reference voltage. The network formed by the lamps 11 and 15 and the resistors 12, 13, 14, 16 and 17 delivers a stable voltage at the output terminals 18 and 19. The operation of this network is well known and does not form part of the invention per se. Any convenient alternative source may be used to supply the reference voltage.

Valves 20 and 21 with their associated circuits amplify the reference voltage available at terminals 18 and 19. These amplifiers are stabilized by a negative feedback network which includes the variable resistor 22. The variable resistor 22 may be used to adjust the effective value of the amplified reference voltage and so control the output voltage of the whole circuit.

The amplified reference voltage is made available to the stabilizing circuit by the transformer 23.

The secondary winding 24 of the transformer 9 provides the supply voltage to be stabilized and applied to the load terminals 25 and 26, the connections being such that the secondary winding of transformer 27 is in series with the load.

The load terminals are also connected in series with the secondary winding of transformer 23 and the grid of valve 32. A condenser 28 is connected in series with this secondary winding while condenser 29 and resistor 30 are connected in shunt with it. This network is arranged in this manner so that no phase shift occurs between the output from the secondary winding of transformer 19 and the grid of the valve 32 of the amplifier. The valve 32 drives the valve 33 in push-pull fashion via the common cathode resistor 34.

The anodes of the valves 32 and 33 are coupled to the grids of valves 35 and 36 by means of the coupling condensers 37 and 38 and the anode resistors 39 and 40. The coupling condensers 37 and 38 are followed by the grid leaks 41 and 42.

Valves 35 and 36 feed the primary winding of transformer 27.

In this circuit the only components which can cause a phase shift are the coupling condensers 37 and 38 and the transformer 27. These components can be designed to give the desired phase shift at the frequency of the supply voltage. As has been indicated previously, this phase shift should preferably approach ninety degrees for the maximum stabilization of the absolute output voltage but should be near zero for the stabilization of output voltage, waveform and phase.

The purpose of the other components shown in the drawing will be evident to those skilled in the art and therefore does not require description. It will also be evident that the circuit diagram represents a practical form of the circuit shown in Figure 2, and functions in the manner previously described.

Under normal circumstances the voltage input to the amplifier comprising the difference between the reference voltage and the voltage across the load, will be small but in the event of failure of either the main power supply, the reference voltage or the amplifier itself, excessively high voltages may be applied to the grid of the input tube of the amplifier, consequently it is advisable to include in the circuit a device for protecting the apparatus against such excessively high voltages. This protection may take the form of high resistances in the grid circuits of the tubes, or limiters of gas-filled or other type may be used.

In order visually to indicate whether the output valves of the amplifier are functioning correctly, indicator lamps or relays may be connected in series with the anode circuits of the tubes.

Similarly, indicator lamps of either the gas-filled or filament type may be connected across the output of the amplifier. These lamps may indicate whether or not the amplifier is quiescent and consequently neither delivering nor absorbing power. They also can be used to indicate if synchronization between the reference voltage and the voltage across the load should cease.

In addition to providing means for the stabilization of the voltage and waveform across a load, the invention provides means for the manual or automatic control or adjustment of the voltage across the load. Manual adjustment may be accomplished by varying the effective values of the reference voltage and the voltage across the load in the circuits which abstract the differences between the two voltages. This variation may be accomplished in any known manner.

Similarly the voltage across the load may be varied by automatic means which are adapted to control the reference voltage. For example, if it is desired to keep the illumination at some particular locality constant, the illumination may be provided in part by lamps fed from a supply stabilized by an arrangement in accordance with the invention. A photoelectric cell may be used to control, by known circuit arrangements, the magnitude of the reference voltage thereby controlling the illumination provided by the lamps fed from the stabilized source.

The invention may also be applied to the maintenance of a stable voltage at the end of a long power line by causing the voltage applied to the line to be automatically adjusted to compensate for varying drops in voltage along the line.

Where it is desired to control relatively large quantities of power the voltage used to operate a subsidiary control voltage, may be controlled by the invention and the subsidiary control voltage may be utilized to control the large quantities of power.

Having now described our invention what we claim is new and desire to secure by Letters Patent is:

1. Apparatus for stabilizing the amplitude, wave form and phase characteristic of an alternating voltage supply coupled to a load with respect to the corresponding characteristic of a reference voltage source, said apparatus comprising an amplifier having input and output circuits, the output circuit being connected in series with said supply and said load, means differentially to combine the voltages of said supply and said source to produce an auxiliary voltage, means to apply said auxiliary voltage to the input circuit of said amplifier, and a negative feedback network coupling the output circuit of said amplifier to the input circuit thereof to maintain the gain of said amplifier at unity.

2. Apparatus for stabilizing the amplitude, wave form and phase characteristic of an alternating voltage supply coupled to a load with respect to the corresponding characteristic of a reference voltage source, said apparatus comprising an amplifier having input and output circuits, said output circuit being connected in series with said supply and said load, first and second transformers each having a primary and a secondary with a one-to-one ratio therebetween, the primary of said first transformer being connected to said supply and the primary of the second transformer being connected to said source, the secondaries of said first and second transformers being connected in series opposition to the input circuit of said amplifier, and a negative feedback network coupling the output circuit of said amplifier to the input circuit thereof and having a feedback factor at which the gain of said amplifier is maintained at unity.

3. Apparatus, as set forth in claim 2, wherein said feedback network includes a third transformer having a primary connected across the output circuit of said amplifier and a secondary connected in series with the serially-connected secondaries of said first and second transformer.

4. Apparatus for stabilizing the amplitude, wave form and phase characteristic of an alternating voltage supply coupled to a load with respect to the corresponding characteristic of a reference voltage source, said apparatus comprising an amplifier having input and output circuits, the output circuit being interposed between said supply and said load, a pair of electron discharge tubes each including a cathode, a control electrode and an output electrode, a common impedance interconnecting the output electrodes of said tubes, means to apply the voltage of said supply to the control electrode of one of said tubes, means to apply the voltage of said source to the control electrode of the other of said tubes in phase opposition to said supply voltage, means to apply the voltage developed across said common impedance across the input circuit of said amplifier, and a negative feedback network coupling the output circuit of said amplifier to the input circuit thereof and having a feedback factor at which the gain of said amplifier is maintained at unity.

GERRIT MAK.
ANDRE WILLEM STORM.

REFERENCES CITED

The following references are of record in the file of this patent:

UNITED STATES PATENTS

| Number | Name | Date |
|---|---|---|
| 1,947,197 | Garman | Feb. 13, 1934 |
| 1,997,657 | Schmutz | Apr. 16, 1935 |
| 2,129,890 | Trucksess | Sept. 13, 1938 |